United States Patent [19]
Amorosi

[11] Patent Number: 5,864,404
[45] Date of Patent: Jan. 26, 1999

[54] PROCESS AND APPARATUS FOR MEASURING THE VOLUME OF AN OBJECT BY MEANS OF A LASER SCANNER AND A CCD DETECTOR

[75] Inventor: Stefano Amorosi, Bologna, Italy

[73] Assignee: DataLogic S.p.A., Bologna, Italy

[21] Appl. No.: 841

[22] Filed: Dec. 30, 1997

[30] Foreign Application Priority Data

Dec. 31, 1996 [IT] Italy ................................. 96830666.2

[51] Int. Cl.$^6$ .................................................. G01B 11/28
[52] U.S. Cl. ........................ 356/379; 356/377; 356/386; 356/387
[58] Field of Search .................. 356/377, 379, 356/386, 387

[56] References Cited

U.S. PATENT DOCUMENTS

| | | | |
|---|---|---|---|
| 4,650,335 | 3/1987 | Ito et al. | 356/398 |
| 5,412,420 | 5/1995 | Ellis . | |

FOREIGN PATENT DOCUMENTS

| | | |
|---|---|---|
| 0600800 | 6/1994 | European Pat. Off. . |
| 0690287 | 1/1996 | European Pat. Off. . |
| 4240094 | 6/1994 | Germany . |
| 2189594 | 10/1987 | United Kingdom . |
| WO 92 16818 | 3/1992 | WIPO . |

*Primary Examiner*—Frank G. Font
*Assistant Examiner*—Reginald A. Ratiff
*Attorney, Agent, or Firm*—Sughrue, Mion, Zinn, Macpeak & Seas, PLLC

[57] ABSTRACT

The process uses information from the scan sweeps of a laser scanner, and readings with a CCD reader, to obtain a series of stipulated areas corresponding to successive cross-sections of the object as reckoned by moving the object relative to the scanner and the reader. The volume is then obtained by multiplying each of said areas by the feed distance of the object. The possibility is further contemplated of accommodating the slope angles of the scan plane and the read plane, or alternatively neglecting their effects if said angles are sufficiently small. The volume measurement may be accompanied by the reading of an optical code provided on the object.

21 Claims, 2 Drawing Sheets

PROCESS AND APPARATUS FOR MEASURING THE VOLUME OF AN OBJECT BY MEANS OF A LASER SCANNER AND A CCD DETECTOR

This invention relates to a process for measuring the volume of an object by means of a laser scanner and a CCD reader, and to an apparatus implementing the process.

A problem shared by many segments of industry and trade is that of assessing the volume of an object. In particular, the supply and shipment of goods demand that the volume of packages be measured in an automated fashion to provide an element of information which is valuable to the conduction of both the storehouse premises and the carrier means.

Storehouse premises and carriers generally handle objects according to their weight, and to one or more of their linear dimensions regarded as most significant. This handling style is, therefore, approximative and surely less than fully satisfactory.

Accordingly, a first aspect of the invention concerns a process for measuring the volume of an object with at least one laser scanner and at least one CCD reader, which process comprises the following steps:

placing the object onto a bearing surface;

defining a feed direction for the object on the bearing surface;

defining a scan plane, intersecting the plane of the bearing surface along a scan base line which lies transverse to the feed direction, with at least one laser beam from the scanner that overlies the bearing surface being arranged to act in the scan plane;

defining a read plane intersecting the plane of the bearing surface along a read base line which lies transverse to the feed direction, light beams being active in the read plane which are picked up by the CCD reader located above the bearing surface;

moving the object across the bearing surface, along the feed direction, relative to the scan and read planes such that the object will cross these planes;

effecting a series of scan sweeps across the object in the scan plane with the laser beam, such that at each scan sweep, the positions of n points of measurement defining the object outline as spotted by the laser beam are reckoned;

effecting a corresponding series of readings of the object by means of the CCD reader to reckon, at each reading, the maximum width of the object outline as spotted by the CCD reader, each reading being offset in time with respect to the corresponding laser scan sweep by a necessary time period to allow the reading to be effected at the same location on the object where the scan sweep was effected;

processing the information from each scan sweep along with the information from the corresponding reading to define a set of stipulated outlines of the object;

computing the area of each stipulated outline;

computing a feed distance travelled by the object between two successive scan sweeps or between two successive readings;

computing, for each stipulated outline, an elementary volume as the product of the area of the stipulated outline by the feed distance;

computing the volume of the object as the combined sum of the elementary volumes.

The movement of the object across the bearing surface in the feed direction, with respect to the scan plane, should be understood as a relative movement. Thus, either a movement of the object relative to fixed scan and read planes, or a movement of such planes relative to an object held stationary, or both, is contemplated.

This process provides a reasonably accurate measurement of the volume of an object. The matter of approximation will be discussed hereinafter.

The spatial positions of the measurement points can be found in different ways using the scanner. Preferably, they are reckoned by a first measurement in polar coordinates (centered on the origin of the virtual scan source, i.e. on the imaginary point whence the scan rays appear to issue and which may be within or without the scanner and be fixed or movable, according to the optics employed), and a subsequent conversion to Cartesian coordinates in accordance with a reference system having two axes in the plane of the bearing surface, a first of such axes lying parallel to the feed direction, and a third axis perpendicular to the plane of the bearing surface. This embodiment is preferred because the measurement is obtained in coordinates which suit well the measuring instrument (the scanner movement is a polar type), while the result of the processing is expressed in coordinates which suit well the quantities to be measured and the calculations subsequently to be made therewith in which Cartesian coordinate values processed by the CCD reader will appear. However, it would still be possible to operate with polar coordinates by converting the Cartesian coordinate values supplied by the CCD reader to polar coordinates.

Preferably, the CCD reader is focused onto the object, through an automatic focusing system (not shown), according to the height of the points of measurement above the bearing surface as reckoned by the scanner.

The scan plane may be vertical to the bearing surface, or at an angle from the vertical. This angle would suitably be less than 15° (in either directions), preferably less than 10°.

The scan base line may be perpendicular to the feed direction in the plane of the bearing surface, or at an angle from the perpendicular. Suitably, this angle would be less than 15°, preferably less than 10°.

The read base line may be perpendicular to the feed direction in the plane of the bearing surface, or at an angle from the perpendicular. Suitably, this angle would be less than 15°, preferably less than 10°.

Advantageously, the process further comprises a step of reading an optical code provided on the object, and the optical code is preferably read by means of the same scanner and/or CCD reader as is used for scanning and reading the object. In this way, the volume information can be associated with other distinctive information contained in the optical code, such as the type of a product, its manufacturer, price, supplier, destination, etc.

A second aspect of the invention covers an apparatus for measuring the volume of an object, comprising:

a bearing surface for the object, with an object feed direction being defined across the bearing surface;

at least one laser scanner placed above the bearing surface and arranged to act in a scan plane intersecting the plane of the bearing surface along a scan base line transverse to the feed direction;

at least one CCD reader placed above the bearing surface and arranged to act in a read plane intersecting the plane of the bearing surface along a read base line transverse to the feed direction;

a processing unit linked to the scanner and the CCD reader;

a means of moving the object across the bearing surface relative to the scan plane along the feed direction;

a means of reckoning a feed distance travelled by the object between two successive scan sweeps or readings; wherein the scanner and/or CCD reader and/or processing unit is operative to:

effect a series of scan sweeps across the object with the laser beam in the scan plane, reckoning at each scan sweep the positions of n points of measurement which define the object outline as spotted by the laser beam;

effect a corresponding series of readings on the object by means of the CCD reader, reckoning at each reading the maximum width of the object outline as spotted by the light beam of the CCD reader, each reading being offset in time from the corresponding scan sweep by a necessary time period for the reading to be performed on the object at the same location where the scan sweep has occurred;

process the information of each scan sweep along with the information of the corresponding reading to define a set of stipulated outlines of the object;

compute the area of each stipulated outline;

compute a feed distance travelled by the object between two successive scan sweeps or between two successive readings;

compute, for each stipulated outline, an elementary volume as the product of the area of the stipulated outline by the feed distance;

compute the volume of the object as the combined sum of the elementary volumes.

This apparatus can implement the previously described process.

Preferably, the bearing surface is provided by a belt conveyor, and the means for driving the object across the bearing surface relative to the scan and read planes comprises a powered guide roller of the belt conveyor. This arrangement allows the entire object to be scanned in a uniquely simple manner.

The means of reckoning a feed distance travelled by the object between two successive scan sweeps or readings may consist of a simple clock signal, as long as the running speed of the belt conveyor is constant. Preferably, the means of reckoning the feed distance travelled by the object between two successive scan sweeps or readings comprises an encoder active on a guide roller of the belt conveyor. In this way, proper operation can be ensured even where the speed of the belt conveyor is non-constant, for instance because the objects being measured have a large mass which slows down the movement.

Advantageously, this apparatus may also include a means of detecting the object entry to a scan/read zone of the bearing surface located close to the scan and read planes, and/or a means of detecting the object exit from a scan/read zone of the bearing surface located close to the scan and read planes.

Further features and advantages of the invention will be apparent from the following detailed description of some preferred embodiments thereof, given with reference to the accompanying drawings. In the drawings.

Figure 1:
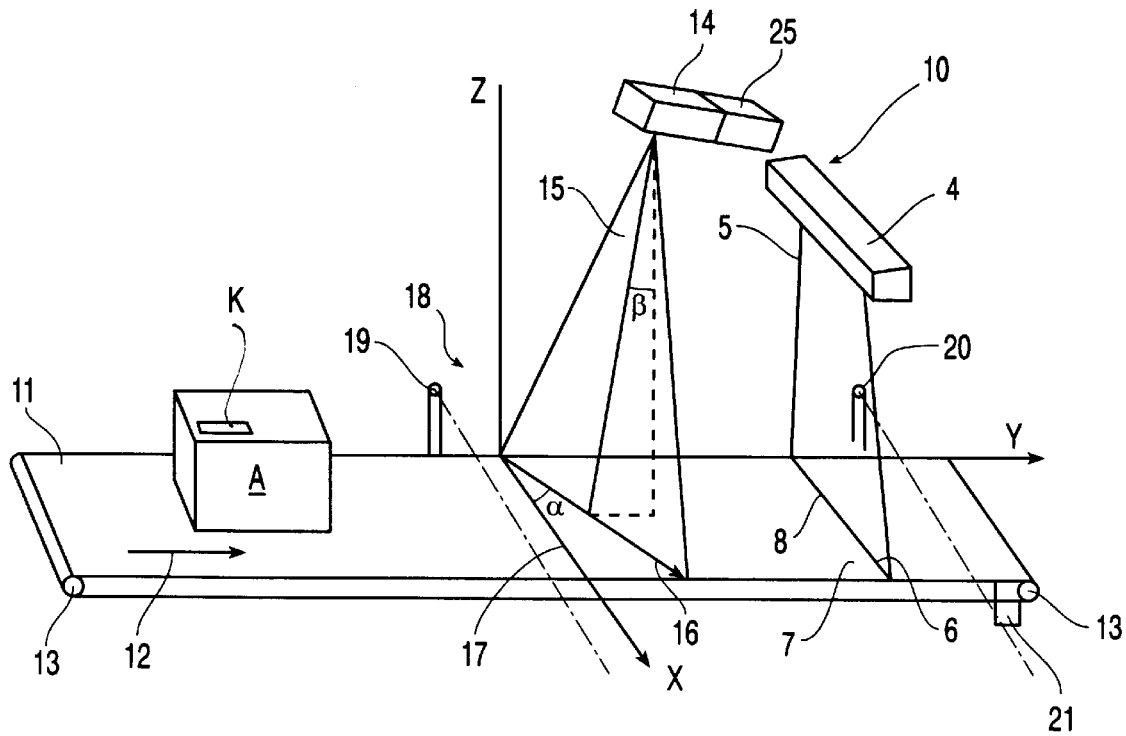
FIG. 1 is a perspective view showing schematically an apparatus according to the invention.

Shown in FIG. 1 is an apparatus 10 which comprises a bearing surface 11 for objects A to be measured for volume.

The bearing surface 11 is substantially horizontal and consists preferably of a belt conveyor, also denoted by the numeral 11, which can be driven along a feed direction 12 and is guided by rollers 13, one of which is powered.

The apparatus 10 includes a modulated light laser scanner 14 capable of measuring a distance, e.g. a similar one to that described in U.S. Pat. No. 5,483,051 by this Applicant. The scanner 14 utilizes a laser beam which sweeps a scan plane 15 incident onto the plane of the bearing surface 11. Specifically, the scanner 14 is placed above the bearing surface 11; the scan plane 15 is set at an angle $\beta$ from the perpendicular to the plane of the bearing surface 11 and intersects this plane along a scan base line 16; the scan base line 16 is inclined at an angle $\alpha$ to a line 17 of the bearing surface 11 which lies perpendicularly to the feed direction 12.

The apparatus 10 also includes a CCD (Charge Coupled Device) reader, shown at 4, which comprises a matrix of very many individual light-sensitive elements arrange into one or more straight arrays (of which only one is used). The CCD reader 4 acts in a read plane 5 which is vertical to the bearing surface 11. The read plane 5 intersects the plane of the bearing surface 11 along a read base line 6 lying at an angle $\gamma$ with respect to a line 7 of the bearing surface 11 which lies perpendicularly to the feed direction 12.

The section of the bearing surface 11 next to the scan base line 16 and the read base line 6, and indicated as the scan/read zone 18, is bounded by an entry detector 19 and an exit detector 20, being both preferably comprised of photocells. A lamp (not shown) is arranged to illuminate the scan/read zone 18 in order for the CCD reader 4 to operate its reckoning.

Figure 2:
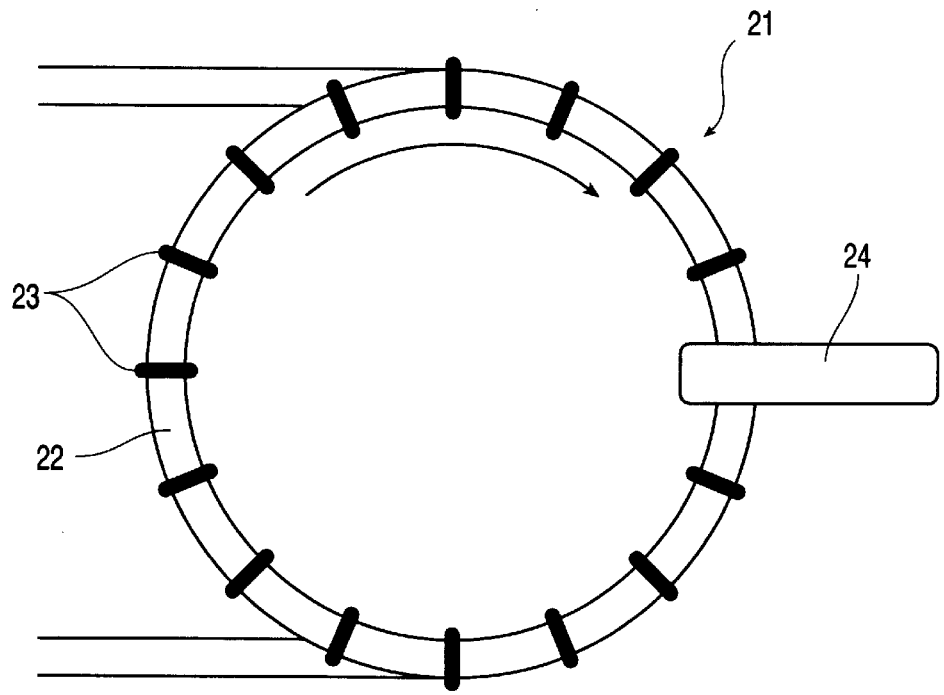
FIG. 2 is a schematic representation of an encoder incorporated to the apparatus of FIG. 1.

The bearing surface 11 is provided with an encoder 21, that is with a device adapted to issue a signal each time that the bearing surface 11 is moved exactly through a predetermined feed distance L. The encoder 21 may be of any type, e.g. electro-optical as shown schematically in FIG. 2. One of the rollers 13 carries, rotatively fixed with it, a disk 22 marked with notches 23 at substantially tangential positions with respect to the plane of the bearing surface 11 which are formed at circumferential spacings equal to the feed distance L sought; an electro-optical notch recognition device 24 is arranged to "see" the notches 23 moving past it and output a signal at each passing notch 23.

Also provided is a processing unit 25, which may be incorporated to the scanner 14, or separate and suitably connected to both the scanner 14 and the CCD reader 4.

The apparatus 10 operates as follows. Objects A to be measured for volume are placed onto the belt conveyor 11, at a spacing from one another. The continuous motion of the belt conveyor 11 will take each object A to the entry detector 19, and then into the scan/read zone 18. The object movement past the entry detector 19 triggers the delivery of a signal to the processing unit 25, whereby the unit will initiate the measuring procedure.

The encoder 21 also delivers a signal to the processing unit 25, during the movement of the belt conveyor 11, each time that the belt conveyor, carrying the object A, travels a distance same as the predetermined feed distance. Each time that a signal is received from the encoder 21, a sampling operation is performed; the scanner 14, once enabled by the sensor 19, will in fact scan the object A continuously; but the processing unit 25 only store the n values of the corresponding scan sweep to the encoder signal. It should be noted that the infeed speed of the belt conveyor 11, fast as it may be, is far slower than the sweep rate of the laser beam of the scanner 14, so that the distance moved by the object A relative to the scan plane 15 during the time taken by the scanner 14 for a full sweep across the scan plane 15 is quite trivial.

Upon the object A reaching the scan base line 16, the laser beam of the scanner 14 will impinge on the object A. Under control by the processing unit 25, the scanner 14 will reckon the positions of n points of measurement spotted by the laser beam on the object A.

To this aim, the scanner 14 reckons, for each point of measurement, both its distance from the scanner 14 (or rather, from the imaginary point whence the rays appear to issue) and the angular position of the laser beam, thereby obtaining the values in polar coordinates of the position of that point in the scan plane 15. These values are then processed by the unit 25 to obtain values therefrom which are representative of the position of the point in a system of Cartesian coordinates having the y axis coincident with the feed direction, the x axis directed along the line 17 (that is, such that the x-y plane will coincide with that of the bearing surface 11), and the z axis directed upwards. For this conversion, the angle $\alpha$ (i.e., the slope of the scan line 16 with respect to the y axis), the angle $\beta$ (i.e., the slope of the scan plane 15 with respect to the perpendicular to the bearing surface 11), and the position of the scanner 14 must be known. The computations involved in this conversion will not be discussed herein because known per se and well within the capability of a person of ordinary skill in the art. Of course, any other selected Cartesian reference system in space could be reduced to that indicated, by a mathematical operation of rotation/translation, and accordingly, can be regarded as equivalent to the indicated system.

With small angles $\alpha$ and $\beta$, less than 15°, the actual error introduced by ignoring them is minimal, on the order of a few percent at most; on the other hand, the complexity of the computation involved to accommodate them would be quite significant. In many practical applications of an apparatus according to the invention, and in order to keep its manufaturing, installation, and setting up costs as low as possible, it is preferable if the angles $\alpha$ and $\beta$ can be kept small (preferably in the 5° to 10° range, with 15° as a maximum) and their effects neglected. In this way, the scan plane 15 would be virtually likened to the plane x-z. Thus, the outcome of the scanning process will be a set of points which lie on the outline of a cross-section through the object, see also FIG. 3.

Figure 3:
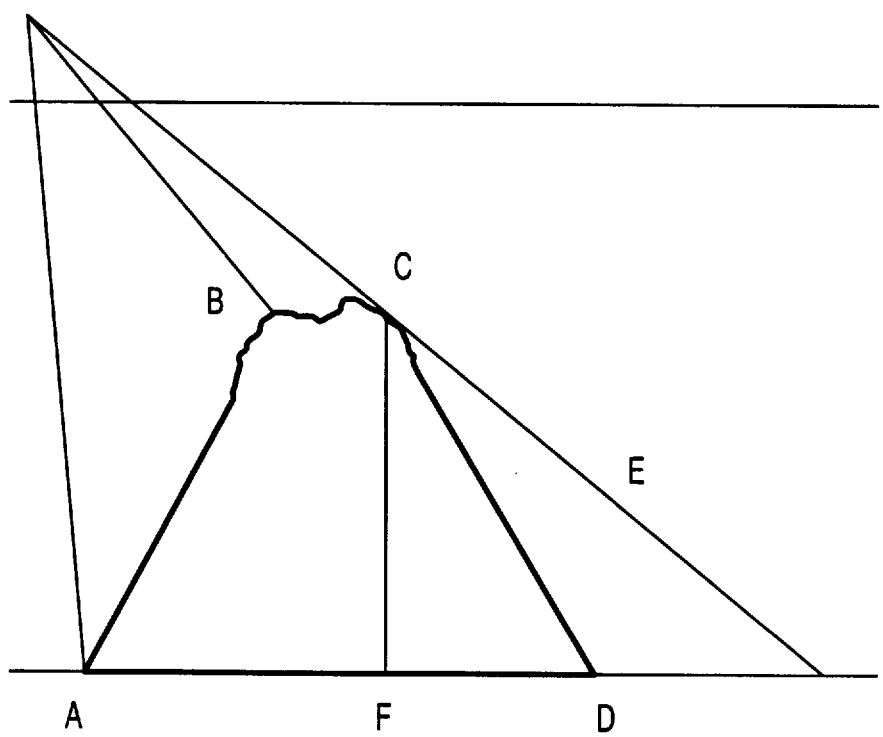
FIG. 3 is a diagram highlighting certain aspects of measurement approximation.

As shown in FIG. 3, however, with an object having some peculiar cross-section, the information provided by the scan sweep may be inadequate to correctly assess the object outline. In fact, due to the position of the scanner 14, the object may have blanketed regions not spotted by the laser beam, such as the outline portion included between points D and C in the figure. To accommodate such regions in a more realistic fashion, reading by the CCD reader 4 is provided.

In fact, at a given scan sweep by the scanner 14, a corresponding reading is effected with the CCD reader 4 which is offset in time (based upon the information received from the encoder 21) so as to be related to the same portion of the object A as has been scanned. In reading by the CCD reader 4, the overall hamper of the object A at the read line 6, i.e. the segment AD in FIG. 3, is reckoned. This value would not correspond exactly to the transverse dimension of the cross-section of the object A, due to the angle $\gamma$ being non-zero. However, the errors introduced by neglecting its effect are minor, just as they were mentioned to be in connection with the angles $\alpha$ and $\beta$, so that they are preferably taken into no account in the above instances, and attention is paid to having the angle $\gamma$ small (preferably in the 5° to 10° range, and not larger than 15°). By measuring $\alpha$, $\beta$ and $\gamma$ through appropriate computations, however, exact measurements can be obtained.

The information gathered from the scanning by the scanner 14 and the reading by the CCD reader 4 is processed by the unit 25 to construct a stipulated outline which approaches the true outline of the cross-section with a desired degree of approximation.

In this respect, from FIG. 3 it can be seen that in no case the true shape of the outline between the points C and D can be found, and that different criteria must be applied for the construction of the stipulated outline. Based on the information supplied by the laser 14 alone, the quadrilateral ABCF would be determined as the stipulated outline, thereby providing an approximation to the nearest value below. On the other hand, by combining with the reading from the CCD reader 4, the segment CD or line CED can be selected between C and D. Selecting the line CD appears to be a statistically more realistic choice if a large number of measurements are considered; however, this choice would fail to tell whether the approximation is to the nearest value below or above for each measurement. By selecting the line CED, we can be assured of an approximation to the nearest value above, even if the absolute error may be a more significant one.

Notice that, in all cases, for objects which approach a parallelepipedon in shape (as do most of the parcels handled by a distributing station), the segment CD would be substantially vertical and the segment FD would tend to zero. Accordingly, the actual differences between the various types of approximations would almost amount to zero in practice, and the stipulated outline would be virtually coincident with the true one.

Then, after obtaining the stipulated outline at each scan sweep and corresponding reading, the unit 25 will compute its area. Several computation processes may be used for the purpose which provide varying degrees of approximation and are of greater or lesser complexity. A specially convenient computation process is to consider the x and z coordinates of the points on the stipulated outline which have either been reckoned by the scanning (sections ABC) or assumed to the processing according to a comparison of the scanning with the reading (section CD, selected as desired). As previously mentioned, the angles $\alpha$, $\beta$ and $\gamma$ may either be measured and their effect calculated, or be neglected. Thus, the area of the stipulated outline can be computed as the sum of several elementary areas, each having a base equal to the difference in value between the x coordinates of two successive points, and a height equal to a stipulated z coordinate to be selected, for example, equal to one value of the z coordinates of the two points (either the first or the second, or the lowest or the highest, or one selected at random), or to the mean therebetween, or an intermediate value.

The area of the stipulated outline is then multiplied by the feed distance (if desired, as multiplied by cos $\alpha$, if the effect of the angle $\alpha$ is to be accommodated), thereby obtaining an elementary volume. The elementary volume corresponds (with the same degree of approximation as the stipulated outline) to the volume of a portion of the object spanned by two successive scan sweeps and readings.

The above-described steps are repeated at different cross-sections of the object, and a series of elementary volumes stored, while the object A locates within the scan/read zone 18. At a certain moment, the exit detector 20 will signal that the object A has moved out of the scan/read zone 18; thereupon, the processing unit 25 terminates the measuring procedure, adds together all the stored elementary volumes, and issues an approximate measurement of the volume of the object A.

The start and end of the procedure for measuring the volume of an object, as described above, are governed by the movement of the object past the entry detector 19 and the exit detector 20. Alternatively, one or both detectors could be omitted. Their functions would then be served by the processing unit 25 using appropriate software to activate the measurement (i.e., clear the elementary volume count) when a stipulated outline of non-zero area corresponds to a scan sweep and reading, and stop it (i.e., pick up the combined sum of the stored elementary volumes) on the occurrence of a predetermined consecutive number of zero area scan sweeps and readings; this number may be as low as 1, or at any rate be a small number.

Where the measuring procedure is initiated from software, the scanner 14 and CCD reader 4 must be kept operating all the time, even if no measuring procedure is in progress, in order for the arrival of an object to be detected. On the other hand, the provision of an entry detector 19 allows the scanner 14 and CCD reader 4 to be disabled when there are no objects to be measured, and accordingly, despite the added complexity it entails in the apparatus construction, it is preferred wherever a markedly discontinuous inflow of objects for measurement is expected. On the other hand, the presence or absence of an exit detector 20 would not impair the ability to turn off the scanner 14 and CCD reader 4 at the end of a measuring procedure. Therefore, the preference would usually go to the embodiment wherein the end of the measuring procedure is detected by software means.

Advantageously, the apparatus 10 also includes a means of reading an optical code K (such as a bar code, a two-dimensional code, a color code, or the like) associated with the object A. A dedicated scanner could be provided, or preferably the scanner 14 or CCD reader 4 could itself be used for the purpose.

In the apparatus described hereinabove, the information about an object A provided by the scanning and reading, i.e. the measurement of its volume and any information to be obtained by reading the optical code K, is preferably recorded in a record of a file stored within the processing unit, so that the file will ultimately contain information covering all the objects that have been moved across the bearing surface. This information can later serve various purposes, e.g. conducting the storehouse premises or loading carriers, printing labels to be attached to the objects, or else.

I claim:

1. A process for measuring the volume of an object with at least one laser scanner and at least one CCD reader, which process comprises the following steps:

placing the object onto a bearing surface;

defining a feed direction for the object on the bearing surface;

defining a scan plane, intersecting the plane of the bearing surface along a scan base line which lies transverse to the feed direction, with at least one laser beam from the scanner that overlies the bearing surface being arranged to act in the scan plane;

defining a read plane intersecting the plane of the bearing surface along a read base line which lies transverse to the feed direction, light beams being active in the read plane which are picked up by the CCD reader, located above the bearing surface;

moving the object across the bearing surface, along the feed direction, relative to the scan and read planes such that the object will cross these planes;

effecting a series of scan sweeps across the object in the scan plane with the laser beam, such that at each scan sweep, the positions of n points of measurement defining the object outline as spotted by the laser beam are reckoned;

effecting a corresponding series of readings of the object by means of the CCD reader to reckon, at each reading, the maximum width of the object outline as spotted by the CCD reader, each reading being offset in time with respect to the corresponding laser scan sweep by a necessary time period to allow the reading to be effected at the same location on the object where the scan sweep was effected;

processing the information from each scan sweep along with the information from the corresponding reading to define a set of stipulated outlines of the object;

computing the area of each stipulated outline;

computing a feed distance travelled by the object between two successive scan sweeps or between two successive readings;

computing, for each stipulated outline, an elementary volume as the product of the area of the stipulated outline by the feed distance;

computing the volume of the object as the combined sum of the elementary volumes.

2. A process according to claim 1, including the step of:

focusing the CCD reader onto the object according to the height of the points of measurement above the bearing surface, as reckoned by the scanner.

3. A process according to claim 1, wherein the inclination angle of the scan plane from the vertical to the bearing surface is smaller than 15°.

4. A process according to claim 3, wherein the inclination angle of the scan plane from the vertical to the bearing surface is smaller than 10°.

5. A process according to claim 1, wherein the inclination angle of the scan base line from the perpendicular to the feed direction on the bearing surface is smaller than 15°.

6. A process according to claim 5, wherein the inclination angle of the scan base line from the perpendicular to the feed direction on the bearing surface is smaller than 10°.

7. A process according to claim 1, wherein the inclination angle of the read base line from the perpendicular to the feed direction on the bearing surface is smaller than 15°.

8. A process according to claim 7, wherein the inclination angle of the read base line from the perpendicular to the feed direction on the bearing surface is smaller than 10°.

9. A process according to claim 1, including the step of reading an optical code provided on the object.

10. A process according to claim 8, wherein the reading of the optical code is effected with the same scanner and/or the same CCD reader as are used for scanning the object and reading the object.

11. An apparatus for measuring the volume of an object, comprising:

a bearing surface for the object, with an object feed direction being defined across the bearing surface;

at least one laser scanner placed above the bearing surface and arranged to act in a scan plane intersecting the plane of the bearing surface along a scan base line transverse to the feed direction;

at least one CCD reader placed above the bearing surface and arranged to act in a read plane intersecting the plane of the bearing surface along a read base line transverse to the feed direction;

a processing unit linked to the scanner and the CCD reader;

a means of moving the object across the bearing surface relative to the scan plane along the feed direction;

a means of reckoning a feed distance travelled by the object between two successive scan sweeps or readings; wherein the scanner and/or CCD reader and/or processing unit is operative to:

effect a series of scan sweeps across the object with the laser beam in the scan plane, reckoning at each scan sweep the positions of n points of measurement which define the object outline as spotted by the laser beam;

effect a corresponding series of readings on the object by means of the CCD reader, reckoning at each reading the maximum width of the object outline as spotted by the light beam of the CCD reader, each reading being offset in time from the corresponding scan sweep by a necessary time period for the reading to be performed on the object at the same location where the scan sweep has occurred;

process the information of each scan sweep along with the information of the corresponding reading to define a set of stipulated outlines of the object;

compute the area of each stipulated outline;

compute a feed distance travelled by the object between two successive scan sweeps or between two successive readings;

compute, for each stipulated outline, an elementary volume as the product of the area of the stipulated outline by the feed distance;

compute the volume of the object as the combined sum of the elementary volumes.

12. An apparatus according to claim 11, wherein the bearing surface is provided by a belt conveyor, and the means for driving the object across the bearing surface relative to the scan plane comprises a powered guide roller of the belt conveyor.

13. An apparatus according to claim 12, wherein the means of reckoning the feed distance travelled by the object between two successive scan sweeps or readings comprises an encoder active on a guide roller of the belt conveyor.

14. An apparatus according to claim 11, further comprising a means of detecting the object entering a scan/read zone of the bearing surface, next to the scan and read planes.

15. An apparatus according to claim 11, further comprising a means of detecting the object exiting a scan/read zone of the bearing surface, next to the scan and read planes.

16. An apparatus according to claim 11, wherein the inclination angle of the scan plane from the vertical to the bearing surface is smaller than 15°.

17. An apparatus according to claim 16, wherein the inclination angle of the scan plane from the vertical to the bearing surface is smaller than 10°.

18. An apparatus according to claim 11, wherein the inclination angle of the scan base line from the perpendicular to the feed direction on the bearing surface is smaller than 15°.

19. An apparatus according to claim 18, wherein the inclination angle of the scan base line from the perpendicular to the feed direction on the bearing surface is smaller than 10°.

20. An apparatus according to claim 11, wherein the inclination angle of the read base line from the perpendicular to the feed direction on the bearing surface is smaller than 15°.

21. An apparatus according to claim 20, wherein the inclination angle of the read base line from the perpendicular to the feed direction on the bearing surface is smaller than 10°.

* * * * *